United States Patent [19]

Miyazako et al.

[11] 4,166,050
[45] Aug. 28, 1979

[54] METHOD OF INCREASING THE VISCOSITY OF PHOTOGRAPHIC COATING SOLUTIONS

[75] Inventors: Takushi Miyazako; Tadao Sakai; Akio Mitsui, all of Minami-ashigara, Japan

[73] Assignee: Fuji Photo Film Co., Ltd., Minami-ashigara, Japan

[21] Appl. No.: 746,559

[22] Filed: Dec. 1, 1976

[30] Foreign Application Priority Data

Dec. 1, 1975 [JP] Japan .................. 50-143609

[51] Int. Cl.² .......... C09H 7/00; G03C 1/30; G03C 1/31; G03C 1/38
[52] U.S. Cl. ................. 260/8; 96/114; 96/114.4; 96/114.5; 96/67; 260/117
[58] Field of Search .............. 260/8, 117; 96/114, 96/114.4, 114.5; 106/125

[56] References Cited

U.S. PATENT DOCUMENTS

| | | | |
|---|---|---|---|
| 3,079,837 | 3/1963 | Theilemann | 96/114.4 X |
| 3,811,889 | 5/1974 | Endou et al. | 96/114.5 X |
| 3,811,897 | 5/1974 | Babbit et al. | 260/8 |
| 3,877,942 | 4/1975 | Nagatomo et al. | 96/50 R |
| 3,877,946 | 4/1975 | Tsuji et al. | 96/114.4 X |
| 3,923,517 | 12/1975 | Yamamoto et al. | 96/114 |
| 3,926,869 | 12/1975 | Horie et al. | 260/8 |
| 4,033,772 | 7/1977 | Sprung et al. | 96/114 |
| 4,119,463 | 10/1978 | Iguchi et al. | 260/29.6 WB |

FOREIGN PATENT DOCUMENTS 43-37968 6/1968 Japan.
1431245 4/1976 United Kingdom.

OTHER PUBLICATIONS

Polymer Handbook, 2nd Ed. 1975, IV-1, IV-2, Brandrup et al.
Chem. Abstracts, vol. 77, 1972, Eda et al., 107714c.

Primary Examiner—Howard E. Schain
Attorney, Agent, or Firm—Sughrue, Rothwell, Mion, Zinn and Macpeak

[57] ABSTRACT

A method of increasing the viscosity of photographic coating solutions which comprises adding polymers having therein the repeating unit represented by the following formula (but having a maleic acid content of more than about 40% by mol'

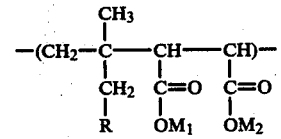

wherein R represents a hydrogen atom or a t-butyl group, and $M_1$ and $M_2$ each represents a cation, which may be identical or different from each other, to gelatin containing photographic coating solutions.

18 Claims, No Drawings

METHOD OF INCREASING THE VISCOSITY OF PHOTOGRAPHIC COATING SOLUTIONS

BACKGROUND OF THE INVENTION

1. Field of the Invention

The present invention relates to a method of increasing the viscosity of gelatin containing photographic coating solutions.

2. Description of the Prior Art

Recently, there has been a tendency for photographic light-sensitive materials to be made to have a multilayer structure in order to improve the quality thereof. However, in photographic light-sensitive materials having a multi-layer structure, since there is a tendency toward a deterioration of the image sharpness or a reduction of the processing speed, a reduction in the thickness of each layer thereof has been employed to counteract these disadvantages. In order to form thin layers, the thickness of the layers or the coating speed thereof must be maintained. However the thickness of the layers and the coating speed are largely affected by the viscosity of the coating solutions. More specifically, since keeping the thickness and coating speed uniform is impossible where the viscosity of the coating solutions is too low or too high, the coating solutions should have a suitable viscosity. Accordingly, it is necessary to control the viscosity appropriately.

Since it was found by Richard Leach Maddox in 1871 that gelatin could be used as a binder in photographic layers such as a silver halide emulsion layer, a large amount of research has been done on photographic gelatin and the importance of gelatin has been recognized (refer to, for example, *Shashin Hattatsushi* Shashingijutsukoza Extra Volume, Chapter 22, written by Yasuji Kamata (issued by Kyoritsu Shuppan Co.) or *Shashinkagaku* pgs. 202-203 § 3 (issued by Kyoritsu Shuppan Co.)). This is the reason presently why gelatin has been used as one of the most important ingredients of a photographic light-sensitive material as well as silver halide. However, gelatin which has excellent photochemical and colloidchemical properties still has insufficient properties.

For instance, viscosity is one of these properties of gelatin which is insufficient. Namely, if the intention is to form thin layers by increasing the concentration of gelatin in order to increase the viscosity of the coating solutions, drying of the photographic layers begins too rapidly causing difficulties in coating.

In order to solve these technical problems, proposals to use certain kinds of copolymers as thickening agents have been made. For example, a method of increasing the viscosity which comprises adding polyacrylic acid, polymethacrylic acid or copolymers of acrylic or methacrylic acid to gelatin coating solutions (U.S. Pat. Nos. 2,461,023 and 3,655,407 and German Patent Application (OLS) No. 2,427,297) is known. This method, however, is inconvenient because a large amount of the polymers needs to be added if they have a low molecular weight and the viscosity of the coating solutions becomes too high if they have a high molecular weight.

SUMMARY OF THE INVENTION

Accordingly, an object of the present invention is to provide thickening agents which do not cause gelatinization when mixed with gelatin, which are easily produced at a low cost, which do not have any adverse influence upon the photographic properties and which have a relatively low molecular weight.

Another object of the present invention is to provide a method of increasing the viscosity of gelatin containing coating solutions which comprises adding the thickening agents described below thereto.

As the result of searching for novel thickening agents, it has now been found that if polymers having therein the repeating unit represented by the following formula (but having a maleic acid acid content of more than 40% by mol', [are added to a gelatin photographic coating]

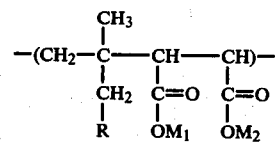

wherein R represents a hydrogen atom or a t-butyl group, and $M_1$ and $M_2$, which can be the same or different, each represents a cation such as a hydrogen ion, an alkali metal ion (such as a Li, Na or K etc. ion) or an ammonium ion are added to gelatin containing photographic coating solutions (including gelatin and/or gelatin derivative containing solutions, hereinafter simply gelatin-containing solutions e.g., present in an amount of about 2% by weight or more in the coating solution), excellent thickening effects are achieved, for example, gelation does not occur during prestorage or coating of the coating solutions and the viscosity can be suitably controlled by changing the amount of the polymers added.

DETAILED DESCRIPTION OF THE INVENTION

It would not have been expected that the above described polymers would result in such excellent thickening effects, because Japanese Patent Publication No. 38712/71, discloses that copolymers of maleic acid and hydrophobic monomers wherein the maleic acid content is above 40% by mol are not preferred, because if they are used for photographic sensitive materials, the viscosity of the coating solutions remarkably increases at coating of the emulsion layers and a gelatinized state occurs in the worst case to render coating impossible, or sufficient thickening effects can not be obtained if the amount is reduced in order to avoid such an increase in viscosity. Suitable viscosities for coating solutions ranging from about 10 to 100 cps, preferably from 30 to 70 cps. (at 40° C.), can be achieved with this invention by employing the copolymer used in the present invention in an amount ranging from about 1 to about 30% by weight to the weight of the gelatin.

Examples of copolymers described in Japanese Patent Publication No. 38712/71 are terpolymers prepared by polymerizing a "hydrophobic monomer", a "maleic acid monoalkyl ester" and "maleic acid" such as an octene-monomethyl maleate-maleic acid terpolymer (% by mol: 45:35:25), while the thickening agents used in the present invention are materials prepared by polymerizing isobutylene or diisobutylene and maleic acid. (The polymers used in the present invention are those prepared by hydrolyzing copolymers of the above described olefins and maleic acid anhydride with alkalis, but they may contain a unit of the formula

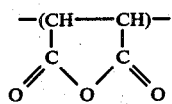

which remains in cases of undesired insufficient hydrolysis or may contain side-reaction products such as the unit of the formula

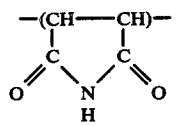

which is formed by processing with ammonia. It is preferred that these units each is not present in an amount above about 5% by mol of the polymers).

Embodiments of the present invention are illustrated in greater detail below.

In the polymers used in the present invention, the maleic acid content can range from about 40 to about 50% by mol and it is preferred that the maleic acid content is 45% by mol or more and particularly 50% by mol or so and the molecular weight is about $5 \times 10^3$ to about $5 \times 10^5$ and particularly $5 \times 10^4$ to $3 \times 10^5$.

The polymers used in the present invention can be produced by hydrolyzing isobutylene-maleic acid anhydride copolymers (ISOBAM, produced by Kuraray Co., Ltd.) or diisobutylene-maleic acid anhydride copolymers using lithium hydroxide, sodium hydroxide, potassium hydroxide or ammonia, etc.

Examples of polymers used in this invention include the following materials:

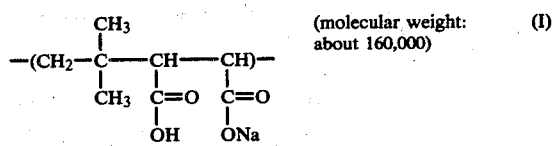

and

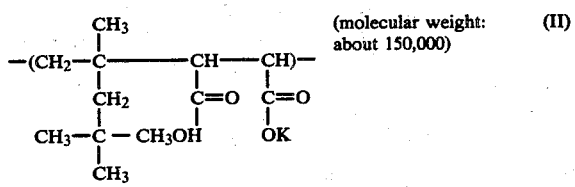

Polymers used in the present invention can also be produced by reacting diisobutylene and maleic anhydride, e.g., in a molar ratio of about 1:1, in a solvent such as ethyl acetate, dioxane, methyl ethyl ketone, diisopropylbenzene, cumene, benzene, etc. in the presence of a catalyst. Suitable catalysts which can be employed include peroxides such as benzoyl peroxide, azobisisobutyronitrile, 2,2'-azobis-(2,4-dimethylvaleronitrile), etc., and such can generally be employed in an amount of about 0.5 to 5.0, preferably 1.0 to 3.0, % by weight. The polymerization is generally conducted at a temperature of about 50° to 100° C., preferably 60° to 90° C., for about 5 to 24 hours, more generally about 8 to 12 hours. Hydrolysis of the produced polymer can be achieved using an alkali in an amount of about equimolar to that of the maleic acid anhydride at a temperature of about 90° C. or higher.

The polymers used in the present invention are added to the gelatin containing coating solutions for forming silver halide emulsion layers, intermediate layers, protective layers, backing layers or subbing layers, etc. The amount of the polymer added is generally about 1 to about 30% (by weight) based on the gelatin and preferably is 3 to 20% (by weight). Various kinds of photographic additives conventionally used such as hardening agents, surface active agents, antifogging agents, spectral sensitizing agents, chemical sensitizing agents or color formers (for example, 2-equivalent or 4-equivalent cyan, magenta or yellow couplers, etc) can be added to the coating solutions. If these additives are used the selection of the surface active agents used together with the polymers of the present invention is important, and anionic or nonionic surface active agents are preferably used. The amount of the surface active agent suitable is about 0.05 to 3% (by weight) based on the gelatin and preferably is 0.1 to 1.0% (by weight).

Examples of suitable surface active agents include natural surface active agents such as saponin, nonionic surface active agents such as alkylene oxide type, glycerin type and glycidol type surface active agents and anionic surface active agents containing acid groups such as carboxylic acid, sulfonic acid, phosphoric acid, sulfuric acid ester or phosphoric acid ester groups.

Additional examples of surface active agents include sodium dodecylbenzene sulfonate, N-oleoyl-N-methyltaurine sodium salt and sodium 14-p-nonylphenyl-5,8,11,14-tetraoxatetradecanesulfonate, etc.

Other suitable surface active agents are described in, for example, U.S. Pat. Nos. 2,240,472, 2,739,891, 3,068,101, 3,158,484, 3,201,253, 3,294,540, 3,415,649, 3,441,413, 3,442,654 and 3,475,174, German Patent Application (OLS) No. 1,942,665, British Pat. Nos. 1,077,317 and 1,198,450, Ryohei Oda, et al, *Kaimenkas-seizai no Gosei to sono Oyo,* Maki Shoten (1964)), A. W. Schwartz, et al, *Surface Active Agents and Detergents,* Interscience Publications Incorporated (1958) and J. P. Sisley *Encyclopedia of Surface Active Agents* Vol. 2, Chemical Publishing Company (1964), etc.

Gelatin is advantageously used as a binder or a protective colloid in the photographic emulsions. However, other hydrophilic colloids can be used too.

For example, it is possible to use proteins such as gelatin derivatives, graft polymers of gelatin with other high molecular materials, albumin or casein, etc.; cellulose derivatives such as hydroxyethylcellulose or carboxymethylcellulose; saccharide derivatives such as agar, sodium alginate or starch derivatives, etc.; and synthetic hydrophilic high molecular weight materials such as polyvinyl acetal, poly-N-vinylpyrrolidone, polyacrylic acid, polyacrylamide, polyvinylimidazole, polyvinylpyrazole and copolymers of the monomers thereof.

As the gelatin, not only lime-treated gelatin but also acid-treated gelatin can be used. Further, gelatin hydrolysis products can be used too. Examples of gelatin derivatives which can be used include those prepared by reacting gelatin with acid halides, acid anhydrides, acid esters, isocyanates, bromoacetic acid, alkane sultones, vinylsulfonamides, maleinimides, polyalkylene oxides or epoxy compounds. Examples of these compounds are described in U.S. Pat. Nos. 2,614,928, 2,763,639, 3,118,766, 3,132,945, 3,186,846 and 3,312,553, British Pat. Nos. 861,414, 1,033,189 and 1,005,784 and Japanese Patent Publication No. 26,845/67.

Examples of the above described gelatin graft polymers which can be used are those prepared by grafting gelatin with homo- or copolymers of vinyl monomers such as acrylic acid, methacrylic acid or the derivatives thereof such as esters or amides, acrylonitrile or styrene, etc. It is particularly preferred to use graft polymers prepared by grafting gelatin with polymers which have a certain degree of compatibility with the gelatin, such as polymers of acrylic acid, methacrylic acid, acrylamide, methacrylamide or hydroxyalkyl methacrylate etc. Examples of these compounds have been described in U.S. Pat. Nos. 2,763,625, 2,831,767 and 2,956,884, etc.

Useful synthetic hydrophilic high molecular weight materials are those described in German Patent Application (OLS) No. 2,312,708 and U.S. Pat. No. 3,879,205.

The photographic emulsion layers and other hydrophilic colloid layers in the photographic sensitive materials prepared using the present invention can be formed on a support or another layer using various known coating methods. Suitable coating methods include dip coating methods, roll coating methods, curtain coating method and extrusion coating methods, etc. The methods described in U.S. Pat. Nos. 2,681,294, 2,761,791 and 3,526,528 are advantageous methods.

The photographic emulsion layers and the other layers in the photographic sensitive materials produced using the present invention are coated onto conventionally used flexible supports such as plastic films, paper or cloth or to rigid supports such as glass, ceramics or metal, etc. Examples of preferred flexible supports include films composed of synthetic or semi-synthetic high molecular weight materials such as cellulose nitrate, cellulose acetate, cellulose acetate butyrate, polystyrene, polyvinyl chloride, polyethylene terephthalate or polycarbonate, etc., and coated or laminated paper prepared by applying or laminating a baryta layer or an α-olefin polymer (such as polyethylene, polypropylene or ethylene-butene copolymers) to the paper. The support can be colored using dyes or pigments. The support can be opaque for the purpose of intercepting light. The surfaces of the support are generally processed to form a subbing layer so as to provide good adhesive properties with photographic emulsion layers. The surfaces of the support can be subjected to a corona discharge, an ultraviolet ray exposure or a flame treatment prior to or after formation of the subbing layer by the above described processing.

Further, in coating, hardening agents described in, for example, C. E. K. Mees & T. H. James, *The Theory of the Photographic Process* 3rd. Ed. pgs. 55–60, MacMillan Co. (1966) or hardening agents described in U.S. Pat. No. 3,316,095 can be advantageously used. Of these hardening agents, preferred results are obtained by using aldehyde type (including mucochloric acid type and aldehyde precursor type, active vinyl type, active halogen type, carbodiimide type, isoxazole type, epoxy type, aziridine type and inorganic type hardening agents. Particularly excellent results are obtained using the following hardening agents.

Aldehyde type:
  Mucochloric acid, mucobromic acid, mucophenoxychloric acid, mucophenoxybromic acid, formaldehyde, dimethylol urea, trimethylolmelamine, 1,3-bis-[(diallylamino) methyl]urea, 1,3-bis-(piperidinomethyl)urea, 1,3-bis-(piperidinomethyl)urea, glyoxal, monomethyl glyoxal, 2,3-dihydroxy-1,4-dioxane, 2,3-dihydroxy-5-methyl-1,4-dioxane, succinaldehyde, 2,5-dimethoxytetrahydrofuran and glutaraldehyde.

Active vinyl type:
  1,3,5-Triacryloyl-hexahydro-s-triazine and 1,3,5-trivinylsulfonyl-hexahydro-s-triazine.

Active halogen type:
  2,4-Dichloro-6-(4'-sulfoanilino)-1,3,5-triazine sodium salt, 2,4-dichloro-6-hydroxy-1,3,5-triazine sodium salt and 2,4-dichloro-6-(2'-sulfoethylamino)-1,3,5-triazine sodium salt.

Carbodiimide type:
  Dicyclohexylcarbodiimide, 1-cyclohexyl-3-(3-trimethylamino-propyl)carbodiimide-p-toluenesulfonate and 1-ethyl-3-(3-dimethylaminopropyl)carbodiimide hydrochloride.

Isoxazole type:
  2,5-Dimethylisoxazole perchlorate, 2-ethyl-5-phenylisoxazole-3'-sulfonate and 5,5'-(p-phenylene)bisisoxazole.

Epoxy type:
  1,4-Bis-(2',3'-epoxypropoxy)butane and 1,3,5-triglycidylisocyanurate Aziridine type:
  1,6-Hexamethylene-N,N'-bisethylene urea and 2,4,6-triethyleneimino-1,3,5-triazine.

Inorganic type:
  Chromium alum and chromium acetate.

Addition of these hardening agents can be carried out in a conventional manner such as by dissolving the agent in water or organic solvents.

The present invention has the effects that coating efficiency is enhanced, because there is no decrease in the viscosity or in the solidifying point even if the gelatin concentration is low and that a large-scale cooling apparatus required due to the decrease in the gel point is not necessary. More specifically, since the gel point of coating solutions containing gelatin as the binder surprisingly increases due to the addition of the polymers of the present invention, it is possible to shorten the time necessary to set the sensitive material (coated photographic layer), by which high speed coating can be carried out effectively in producing photosensitive materials using multi-stage coating such as a wet-on-wet process or multilayer natural color photographic sensitive materials where multilayer application is required. Further, the present invention is additionally effective and economical, because it is possible to enhance the rate of drying the set sensitive materials with warm air, to simplify the cooling step for setting or to simplify the cooling apparatus.

Moreover, according to the present invention, there are the advantages that not only do the viscosity and the gel point increase but also photographic properties are not adversely affected by addition of the polymers (for example, color stains do not occur).

Furthermore, the present invention can be carried out advantageously from a practical standpoint, since the polymers are easily available at a low price.

The present invention will be illustrated with reference to the following examples. However, the present invention is not to be construed as being limited to these examples. Unless otherwise indicated herein all parts, percents, ratios and the like are by weight.

In this specification, molecular weights are number average molecular weights.

EXAMPLE 1

In addition to the above described polymers (I) and (II) used in the present invention, a copolymer (III) described in U.S. Pat. No. 3,877,942.

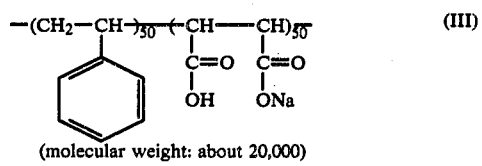

(molecular weight: about 20,000)

and a copolymer (IV) described in U.S. Pat. No. 2,461,023

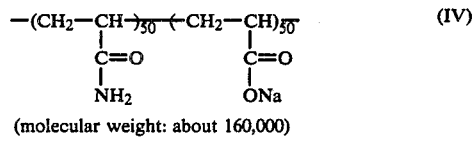

(molecular weight: about 160,000)

were synthesized as comparison samples. Then, solutions having the composition shown in Table 1 below were prepared.

Table 1

| Additive | A | B | C | D | E |
|---|---|---|---|---|---|
| Gelatin (inactive) | 80 g | 80 g | 80 g | 80 g | 80 g |
| Polymer | I(15 g) | II(15 g) | III(15 g) | IV(15 g) | — |
| 2,4,6-Triethyleneimino-1,3,5-triazine (1% aqueous solution) | 100cc | 100cc | <100cc | 100cc | 100cc |
| Sodium Dodecylbenzenesulfonate/Sodium Nonylphenoxypolyethyleneoxy-propanesulfonate (1% aqueous solution; 1:1 molar ratio) | 100cc | 100cc | 100cc | 100cc | 100cc |
| H$_2$O | 1700cc | 1700cc | 1700cc | 1700cc | 1715cc |

Viscosities (c.p.) at 40° C. of each sample just after preparation of the solutions, after 1 hour, after 3 hours, after 7 hours and after 24 hours were measured using an E type viscosimeter (10 RPM) (produced by Tokyo Keiki Seizo Co., Ltd). The results obtained are shown in Table 2 below.

Table 2

| Sample | Just after Preparation of Solution | After 1 hour | After 3 hours | After 7 hours | After 24 hours |
|---|---|---|---|---|---|
| A | 31.2 | 32.5 | 33.4 | 34.8 | 36.7 |
| B | 29.8 | 31.2 | 31.9 | 33.6 | 35.3 |
| C | 26.4 | 33.2 | 58.3 | 93.5 | Gelation |
| D | 22.7 | 23.0 | 23.2 | 23.5 | 23.9 |
| E | 20.5 | 20.9 | 21.1 | 21.9 | 22.4 |

It is understood from the results in Table 2 that the viscosity of the gelatin is remarkably increased in cases of using the copolymers of the present invention and there is less variation of viscosity with the lapse of time. On the contrary, in Comparison Samples C and D, gelation occurs with the lapse of time or the viscosity does not so increase. The occurrence of gelation with the lapse of time as in Sample C is very disadvantageous with respect to steps for preparation. In the case of using gelatin alone (Sample E), the viscosity is quite low as compared with that of Samples A and B. Accordingly, it is understood that thickening agents which increase the viscosity and cause less variation of viscosity with the lapse of time can be obtained according to the present invention.

EXAMPLE 2

Samples A', B', C' and D' were prepared from 500 g of a 20 wt% aqueous solution of the same gelatin as in Example 1 and 500 g of a 2 wt% aqueous solution of Polymers (I), (II), (III) and (IV). Further, Sample E comprising a 10 wt% aqueous solution of gelatin was prepared for comparison.

The gel point of each sample was measured by the method described in *Shashinyo Gelatin Shikenho* pgs. 2 and 3 (Shashinyo Gelatin Shikenho Joint Council, 1970). The results obtained are shown in Table 3 below.

Table 3

| Sample | Gel Point (average value of 3 measurements) (°C.) | Increase in Gel Point (°C.) |
|---|---|---|
| Sample A' | 31.1 | 2.9 |
| Sample B' | 32.0 | 3.8 |
| Sample C' | 29.9 | 1.7 |
| Sample D' | 28.7 | 0.5 |
| Sample E' | 28.2 | — |

It is understood from the results in Table 3 that the gel points of Samples A' and B' using the polymers of the present invention are remarkably high as compared with that of Sample E' and higher than those of Samples C' and D' using other polymers for comparison. On the basis of the fact that the cooling load is reduced to a fair extent when the gel point increases by 1° C., it will be understood that the effect of the increase of the gel point according to the present invention is large.

While the invention has been described in detail and with reference to specific embodiments thereof, it will be apparent to one skilled in the art that various changes and modifications can be made therein without departing from the spirit and scope thereof.

What is claimed is:

1. A method of increasing the viscosity of a photographic coating solution containing gelatin which comprises adding a polymer having therein the repeating unit represented by the following formula

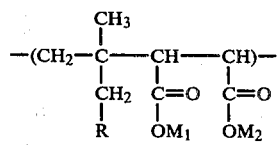

wherein R represents a hydrogen atom or a t-butyl group, and $M_1$ and $M_2$, which can be the same or different, each represents a cation;

said polymer having a maleic acid content of more than 40% by mol; to the gelatin containing photographic coating solution, wherein the molecular weight of said polymer is about $5 \times 10^3$ to about $5 \times 10^5$, said coating solution further containing a hardening agent and a member selected from the group consisting of an anionic or nonionic surface active agent.

2. The method of claim 1, wherein R is a hydrogen atom.

3. The method of claim 1, wherein R is a t-butyl group.

4. The method of claim 1, wherein $M_1$ and $M_2$ is selected from the group consisting of a hydrogen ion, an alkali metal ion, or an ammonium ion.

5. The method of claim 1, wherein said repeating unit has the formula (I) or (II)

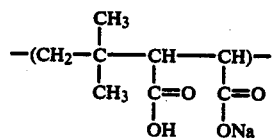

or

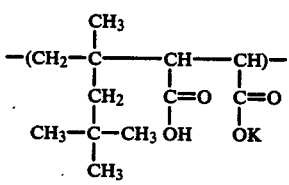

6. The method of claim 1, wherein said maleic acid content is about 45% by mol or higher.

7. The method of claim 1, wherein said polymer is added in an amount of about 1 to about 30% by weight based on the amount of gelatin present in said photographic coating solution.

8. The method of claim 1, wherein said photographic coating solution is a photographic coating solution containing gelatin or a gelatin derivative, wherein said gelatin derivative is selected from the group consisting of those prepared by reacting gelatin with acid halides, acid anhydrides, acid esters, isocyanates, bromoacetic acid, alkane sultones, vinylsulfonamides, maleinimides, polyalkylene oxides or epoxy compounds.

9. The method of claim 1, wherein said molecular weight is number average molecular weight.

10. The method of claim 1, wherein said coating solution has a viscosity ranging from about 10 to about 100 cps (at 40° C.).

11. The method of claim 1, wherein said coating solution has a viscosity ranging from 30 to 70 cps (at 40° C.).

12. The method of claim 10, wherein said polymer is added in an amount of about 1 to about 30% by weight based on the amount of gelatin present in said coating solution.

13. The method of claim 1, wherein the amount of said surface active agent is about 0.05 to 3% by weight based on said gelatin.

14. The method of claim 1, wherein the amount of said surface active agent is about 0.1 to 1% by weight based on said gelatin.

15. The method of claim 13, wherein said hardening agent is an aziridine hardening agent.

16. The method of claim 15, wherein said hardening agent is 1,6-hexamethylene-N,N'-bisethylene urea.

17. The method of claim 15, wherein the hardening agent is 2,4,6-triethyleneimino-1,3,5-triazine.

18. The method of claim 17, wherein said surface active agent is sodium dodecylbenzene sulfonate.

* * * * *